United States Patent Office 3,629,164
Patented Dec. 21, 1971

3,629,164
FOAMED BLEND OF PROPANE-PRECIPITATED ASPHALT ETHYLENE-ACRYLATE/METHACRYLATE COPOLYMER AND POLYOL CROSS-LINKED IN-SITU
Wayne E. Smith, Overland Park, and Francis R. Galiano, Prairie Village, Kans., and Richard H. Havens, Kansas City, Mo., assignors to Gulf Research & Development Company, Pittsburgh, Pa.
No Drawing. Filed May 23, 1969, Ser. No. 827,147
Int. Cl. C08f 47/10, 45/52
U.S. Cl. 260—2.5 R
5 Claims

ABSTRACT OF THE DISCLOSURE

A tough, cohesive, non-tacky blend results when propane-precipitated asphalt is mixed with a copolymer of ethylene with a lower alkyl acrylate or methacrylate, such as methyl acrylate, and, optionally, a polyol, such as glycerine, which is cross-linked in situ to increase tensile strength. This blend is then foamed with conventional blowing agents.

BACKGROUND

This invention relates to foamed propane-precipitated asphalt, improved by adding ethylene-lower alkyl acrylate/methacrylate copolymers and, optionally, crosslinking the copolymer with polyols.

U.S. Patent 3,177,164 to Mills et al. discloses a process for foaming a mixture of asphalt and a copolymer of ethylene and vinyl acetate. However the Mills reference makes no teaching of propane-precipitated asphalt, in that it discusses only natural asphalt and those asphalts derived from petroleum refining operations such as vacuum distillation, solvent extraction and oxidation processes or combinations of them. Propane-precipitated asphalt is a byproduct in the manufacture of commercial asphalt. The crude petroleum still bottoms are dissolved in propane under pressure. The soluble portion is recovered and the resulting precipitate is blended with paving asphalt, coker feed, or discarded. This propane precipitated asphalt consists primarily of polymeric fused-ring aromatics with short aliphatic side chains. It is a brown, powdery, yet tacky material with a low softening point (86° C., ring and ball), with insufficient strength to permit molding. It is the precipitated material left behind from the petroleum refining operations described in the Mills patent. By itself, it is totally unsatisfactory as a raw material for foams.

In a search to find polymeric material with which propane-precipitated asphalt could be combined to upgrade it for use in the manufacture of foam, the propane-precipitated asphalt was found to be incompatible with the majority of materials tested, such as polystyrene, polybutadiene, polyisoprene, butadiene-acrylonitrile, butyl rubber, SBR rubber, EPR rubber, and polyethylene. Combinations of blown (oxidized) asphalts wtih these materials were also unsatisfactory from the standpoint of brittleness, lack of tensile strength, tackiness, or a combination of these. The same is true of combinations of blown asphalt with copolymers of ethylene and lower alkyl acrylate/methacrylate. For example, blown asphalt having a needle penetration of 9 and a ring and ball softening point of 154° C. was blended with a copolymer of ethylene and methyl acrylate. The product was too soft to evaluate. Another blown asphalt having a needle penetration value of 5 and a ring and ball softening point of 154° C. was blended with the same ethylene copolymer, containing 23% methyl acrylate, and found to have a tensile strength of 131 (quite low) and a softening point of greater than 210° C. This blend would not foam by conventional techniques. By increasing the copolymer amount up to the point where equal amounts of copolymer and asphalt were used, a foam can be made but the resultant yield strength of the blended material is still not equivalent to the blends of this invention (yield strength is about one half that of the blends of this invention).

SUMMARY OF INVENTION

It has been discovered that the only combination of materials for satisfactory foams of propane-precipitated asphalt consists of blends of the propane-precipitated asphalt with copolymers of ethylene and lower alkyl acrylates or methacrylates or vinyl acetate. By lower alkyl is meant alkyl groups having 1 to 8 carbon atoms. At levels as low as 10% by weight coploymer with 5 to 50% by weight ester in the copolymer, tough, cohesive, non-tacky blends are obtained. The linear relationship between tensile strength of the blend and percent copolymer was demonstrated. Using a copolymer containing 77% ethylene and 23% methyl acrylate (having a melt index of 3), incorporation of 20% copolymer into 80% (by weight) of propane-precipitated asphalt more than doubled the tensile strength. The tensile strength of the blend can be increased up to 60% by cross-linking the ester groups with polyol. The asphalt-copolymer blends and crosslinked blends are used to prepare rigid foams with fine, closed cell structure. Densities of the foams ranged from 9 to 12 pounds per cubic foot and compressive strengths ranged from 10 to 53 p.s.i.

These materials should find use where rigid foams are normally used, such as in sandwich panel construction, insulation, refrigeration equipment or in floatation equipment.

DESCRIPTION OF PREFERRED EMBODIMENTS

The method and composition of this invention uses 10 to 50 percent by weight, and preferably 15 to 30 percent by weight of the ethylene copolymer blended into a corresponding 50 to 90 percent by weight, and preferably a 70 percent to 85 percent by weight portion of the propane-precipitated asphalt. The copolymer contains 5 to 50 percent by weight, and preferably 10 to 30 percent by weight of the lower alkyl acrylate or methacrylate, and correspondingly 50 percent to 95 percent, preferably 70 percent to 90 percent ethylene comonomer. The copolymers of this invention have a melt index ranging from 0.2 to 2000 and preferably 1 to 1000. The lower alkyl acrylate or methacrylates used for this invention are the methyl, ethyl, n-butyl, isobutyl, and etc.; the methyl and ethyl acrylates and methacrylates are preferred, and methyl acrylate is particularly preferred. The blends of this invention which contain the polyol preferable contain 0.1 to 10 percent by weight and 0.01 to 1 percent of a crosslinking catalyst. Although any polyol may be used glycerine, pentaerythritol, neopentyl glycol, propylene glycol, and ethylene glycol are preferred. Any of the known crosslinking catalysts can be used, such as lower alkyl titanates, toluene sulfonic acid and lithium-2-ethylhexanoate. Any of the known foaming agents can be used to prepare the foams of this invention, such as azobisisobutyronitrile, carbon dioxide, calcium hydride-gypsum, and the disubstituted azodicarbonamides.

EXAMPLES

Example I

We have found that the tensile strength of the ethylene-methylacrylate-propane-precipitated asphalt blends could be increased by crosslinking via an ester exchange reaction. The method was first tried on undiluted copolymer. Treatment with glycerine and p-toluene sulfonic acid or lithium-2-ethylhexanoate as catalyst resulted in virtually complete crosslinking.

A resin flask equipped with a steam-heated condenser, motor-driven stirrer, and immersion thermometer was charged with 100 g. of an ethylene-methyl acrylate copolymer having a melt index of 1000 (18% methyl acrylate—.275 mole), 12.0 g. of glycerine (.13 mole) and 3.7 g. of lithium-2-ethylhexanoate. The mixture was heated until stirrable, then heated and stirred until a reaction was initiated. Liquid began condensing in a trap connected to the upper end of the condenser at 235° C. Within 10 minutes the reaction mass had set up on the stirrer and heating and stirring were stopped. After cooling, the reaction mixture was added to 1500 ml. of xylene. After standing over the weekend at room temperature, the polymer-xylene mixture was a completely gelled mass. The gel was ground in a blender with a 4-fold volume of methanol. The precipitate was collected and reground with methanol. It was again collected on a filter and dried to give a white powder. A Soxhlet thimble was charged with 4.0 g. of the powder. The sample was extracted for 6 hours with refluxing xylene and then dried to a constant weight of 3.9 g. (Uncrosslinked, this ethylene-methyl acrylate copolymer is completely soluble in hot xylene at this level.) Thus, $$\text{the percentage of crosslinking} = \frac{3.9}{4.0} = 97.5\%$$

Treatment of asphalt-copolymer blends also resulted in crosslinking, as indicated by the increase in tensile strength as shown in Table I.

Example II

A resin flask, charged with 80.0 g. of propane-precipitated asphalt and 20.0 g. of an ethylene-methyl acrylate copolymer containing 23% by weight of methyl acrylate and having a melt index of 3, was heated to 200° C. When the mixture was homogeneous, 1.0 g. of pentaerythritol and 0.1 of tetrabutyltitanate were added. The mixture was stirred and heated for 3 hours. The material was foamed as shown in Table II.

Example III

A comparison of neopentyl-glycol-treated blends with the untreated blends is given in Table I. The blend used is the same as in Example II, varying only in percent copolymer.

TABLE I.—EFFECT OF CROSSLINKING VIA ESTER INTERCHANGE ASPHALT-COPOLYMER BLENDS

| | Softening point, °C.[1] | Tensile break, p.s.i.[2] |
|---|---|---|
| Treated 15% blend [3] | 104 | 539 |
| Untreated 15% blend | 90 | 251 |
| Treated 20% blend | 109 | 819 |
| Untreated 20% blend | 91 | 510 |

[1] Ring and ball. ASTM D36.
[2] ASTM D638.
[3] By weight.

The foamability of the blends and crosslinked blends was tested by mixing and heating them with azobisisobutyronitrile (Vazo).

Example IV

Foaming procedure.—Samples of the blends were ground to a powder in a blender with Dry Ice. A 20.0 g. portion of the powder was mixed with 1.0 g. of Vazo by grinding the solids together in a mortar and pestle in the presence of Dry Ice. The thoroughly mixed material was transferred to a foaming vessel (polymer-impregnated cup) and was preheated at 80° C. for one hour. It was then transferred to an oven set at 105° C. The foaming period was 15 minutes.

The foams were tested in accordance with ASTM methods. Density and compressive strength data for blends, and blends treated with various crosslinking agents are given in Table II. For the sake of comparison, a foam made from a blown asphalt-20% by weight Elvax (polyethylene-vinylacetate copolymer) blend foamed with calcium hydride-gypsum is included. (U.S. 3,177, 1964.)

The propane-precipitated asphalt-copolymer blends may also be foamed with carbon dioxide.

Example V

A 250 ml. reactor equipped with a Magne-Dash stirrer and lined with Teflon was charged with 40.0 g. of 20% by weight ethylene copolymer of Example II in 80% by weight of propane-precipitated asphalt. The material was heated and stirred at 200° C. and 800 p.s.i. $CO_2$ for one hour. The reactor was cooled by immersion in cold water and after 20 minutes, the pressure was rapidly released. The material expanded to the top of the Teflon liner. The foam had a very fine, closed cell structure and a density of .29. The properties are given in Table II.

TABLE II

[Foams: 20% by weight ethylene copolymer-propane-precipitated asphalt blends foaming agent: Vazo]

| | | | Foams | |
|---|---|---|---|---|
| Material | Treatment (crosslinking) | Unformed tensile break, p.s.i. | Density,[1] lbs./cu. ft. | Compressive[2] strength, p.s.i. |
| 20%[3] ethylene copolymer of Example II | None | 500 | 9.4 | 22.5 |
| 20% ethylene copolymer of Example II | Glycerine-TSA [4] | 735 | 10.0 | 53 |
| 20% ethylene copolymer of Example II | Pentaerythritol-TBN [5] | 578 | 11.9 | 30 |
| 20% ELVAX | None | 450 | 14.4 | 40 |
| 20% ELVAX blown asphalt blend | Foamed with CaH₂ gypsum [6] | | 25 | 15 |
| 20% ethylene copolymer of Example II | Foamed with $CO_2$ | 500 | 18.6 | 92 |

[1] Density by H₂O displacement.
[2] ASTM D1621.
[3] By weight.
[4] Toluene sulfonic acid.
[5] Tetrabutyltitanate.
[6] U.S. 3,177,164, to Sun Oil Co.

We claim:
1. The method of preparing foam from propane-precipitated asphalt consisting essentially of
   blending from about 70 to about 85 weight percent of a propane-precipitated asphalt, consisting essentially of polymeric fused-ring aromatics with short aliphatic side chains, with from about 30 to about 15 weight percent of a copolymer consisting of ethylene and a lower alkyl acrylate, said copolymer having a melt index of from about 1 to about 1000 and containing from about 70 to about 90 weight percent ethylene, at a temperature above the softening point of said asphalt but below the degradation temperature of both components,
   heating said blend with from about 0.1 to about 10 weight percent of a polyol to crosslink said copolymer with said polyol via an ester interchange reaction,
   adding a foaming agent to said cross-linked blend, and
   foaming said crosslinked blend whereby an improved propane-precipitated asphalt foam is obtained having a density of from about 9 to about 12 pounds per cubic foot and a compressive strength of from about 10 to about 53 p.s.i.

2. The method of claim 1 wherein said polyol is selected from the group consisting of glycerin, pentaerythritol, neopentyl glycol, propylene glycol, and ethylene glycol.

3. The method of claim 1 wherein the copolymer is ethylene-methyl acrylate.

4. The method of claim 3 wherein said copolymer has a melt index of 3 and contains about 23 weight percent methyl acrylate.

5. An improved propane-precipitated asphalt foam prepared by the process as set forth in claim 1.

References Cited
UNITED STATES PATENTS

| | | | |
|---|---|---|---|
| 3,177,164 | 4/1965 | Mills et al. | 260—28.5 AS |
| 3,336,252 | 8/1967 | Raichle et al. | 260—28.5 AS |

MURRAY TILLMAN, Primary Examiner

W. J. BRIGGS, SR., Assistant Examiner

U.S. Cl. X.R.

260—28.5 AS, 86.7